United States Patent [19]

Mayhan et al.

[11] Patent Number: 4,589,964

[45] Date of Patent: May 20, 1986

[54] PROCESS FOR GRAFT COPOLYMERIZATION OF A PRE-FORMED SUBSTRATE

[75] Inventors: Kenneth G. Mayhan, Irvine, Calif.; Robert A. Janssen, Eden Prairie, Minn.; William J. Bertrand, Sunnymead, Calif.

[73] Assignee: American Hospital Supply Corporation, Evanston, Ill.

[21] Appl. No.: 580,119

[22] Filed: Feb. 14, 1984

Related U.S. Application Data

[60] Continuation-in-part of Ser. No. 294,470, Aug. 20, 1981, abandoned, which is a division of Ser. No. 195,103, Oct. 8, 1980, Pat. No. 4,311,573.

[51] Int. Cl.$^4$ ............................................. C08F 291/18
[52] U.S. Cl. .............................................. 522/85; 522/86; 427/302; 427/322; 525/244; 525/246; 525/247; 525/262; 525/421; 525/445; 525/455; 525/468; 525/479; 525/529; 525/904; 527/103
[58] Field of Search ............. 525/904, 247, 244, 421, 525/455, 479, 529; 204/159.13, 159.15, 159.16

[56] References Cited

U.S. PATENT DOCUMENTS 3,008,920 11/1961 Urchick ............................ 260/45.5
3,458,597 7/1969 Jabloner ............................ 525/904

*Primary Examiner*—Carman J. Seccuro
*Attorney, Agent, or Firm*—Tilton, Fallon, Lungmus

[57] ABSTRACT

A process for modifying the surface characteristics of a pre-formed polymeric substrate to impart hydrophilicity, hydrophobicity, or other desired properties thereto, by peroxidizing the surface of the substrate and then allowing the active sites along the polymer chains to generate free radicals which induce graft polymerization of a suitable ethylenic monomer (or other ethylenically-unsaturated compound) onto the surface of the substrate is described. Such graft copolymerization is undertaken in the presence of variable valence metal ions in a reduced state under acidic conditions and at selected reaction times and relatively low temperatures, and ideally in the presence of squarate ions (diketocyclobutenediol) to control the physical characteristics of the surface graft and to restore the metal ions to their lower valence state without at the same time producing deleterious by-products.

7 Claims, 2 Drawing Figures

PROCESS FOR GRAFT COPOLYMERIZATION OF A PRE-FORMED SUBSTRATE

RELATED APPLICATION

This application is a continuation-in-part of our co-pending application Ser. No. 294,470, filed Aug. 20, 1981, now abandoned, which in turn is a division of application Ser. No. 195,103, filed Oct. 8, 1980, now U.S. Pat. No. 4,311,573.

BACKGROUND AND SUMMARY

Procedures have been known in the past for graft copolymerizing various monomers onto radiation-peroxidized polymers. Various solid or semi-solid polymeric substrates have been used, including polyethylene, polypropylene, polymethylmethacrylate, silicone rubber, polycarbonates, polyesters, natural and synthetic rubbers, polyurethanes, polyamides, cured epoxy resins, cellulosics, polyvinyl chloride formulations, polystyrene, natural fibers and various copolymers. The basis for some of the reported work was reported by Chapiro, J. Polymer Sci.: Symposium No. 50, 181–188 (1975). The grafting monomer may be any ethylenically-unsaturated compound capable of free radical polymerization. Refer to U. S. Pat. No. 3,008,920.

The technique may involve the pre-irradiation of a polymer with ionizing radiation in the presence of oxygen to build up a population of peroxides in and on the polymer, followed by a heat treatment of the peroxidized polymer in the presence of an appropriate monomer. While peroxidation of the polymer would typically result from subjecting the polymer to high energy ionizing radiation (gamma ($\gamma$) rays, or high energy electrons produced by a particle accelerator), other methods of peroxidizing the polymeric substrate, such as ozonization, may be used. (Refer to U. S. Pat. Nos. 3,008,920 and 3,070,573).

In theory, graft polymerization onto the surface of an article formed of a solid or semi-solid polymer appears highly desirable because it may give rise to modification of the surface properties of the substrate without causing major changes in the physical characteristics of the substrate as a whole. For example, medical devices are often formed of organosilicone compounds, particularly silicone rubber, because of the relative physiological inertness, high permeability to gases such as oxygen and carbon dioxide, and thermal stability. However, such materials are also hydrophobic. There is evidence to indicate that hydrophobic polymers are less biocompatible and less thromboresistant than hydrophilic polymers but, unfortunately, hydrophilic polymers are generally characterized by relatively low physical strength in aqueous environments. An objective, therefore, would be to render hydrophilic, by means of graft polymerization, only the surface of an article formed of silicone rubber or some other suitable substrate polymer.

In practice, processing complications have interfered with the realization of such an objective. One such complication involves simultaneous homopolymerization of the monomer bath along the formation of the surface grafts; however, it has been indicated that homopolymerization may be minimized by incorporating a metal redox system to convert the hydroxyl radical to hydroxyl ion. O'Neill, T., J. Polymer Sci.: Part A-1, Vol. 10, 569–580 (1972).

Another complication in the surface grafting of a preformed polymeric substrate concerns depth control of the graft. If the bulk properties of the substrate are to be retained, then the graft depth should be no greater than necessary to alter only the surface characteristics of the article. Past efforts, in our laboratories, to graft polymerize only the surface of an article has generally been frustrated by the development of a graft of excessive depth. The swelling and degrading of the article as a whole, and/or the formation of a graft of insufficient density was often encountered.

Accordingly, it is an object of this invention to provide a graft polymerization process for modifying the surface characteristics of a pre-formed solid or semi-solid polymeric substrate wherein homopolymerization is inhibited and graft depth and density may be effectively controlled. It is a further object to provide a process in which the agent for inhibiting homopolymerization also functions to accelerate graft polymerization. Where the monomer bath is to be used in successively treating a multiplicity of polymeric articles for the purpose of modifying the surface characteristics of such articles, a special complexing agent may be utilized for regenerating the homopolymerization inhibitor and also for use in controlling the depth and density of the graft.

In brief, the process involves the surface treatment by graft polymerizing techniques of a solid or semi-solid polymeric substrate having peroxide groups, including hydroperoxide groups, at the surface thereof. An agent which functions both as an accelerator and as a homopolymerization inhibitor, in particular, an agent which provides a source of ferrous ions or other variable valence metal ions in their reduced state, prevents the development of free radicals in solution by a redox mechanism which also results in the formation of higher valence (e.g., ferric) ions. Graft depth is controlled to a major extent by regulating pH and/or salt concentrations, and also by the inclusion of an agent, squaric acid, which complexes with the ferrous ions to limit the mobility of such ions in terms of surface penetration.

DRAWINGS

DETAILED DESCRIPTION

Figure 1:
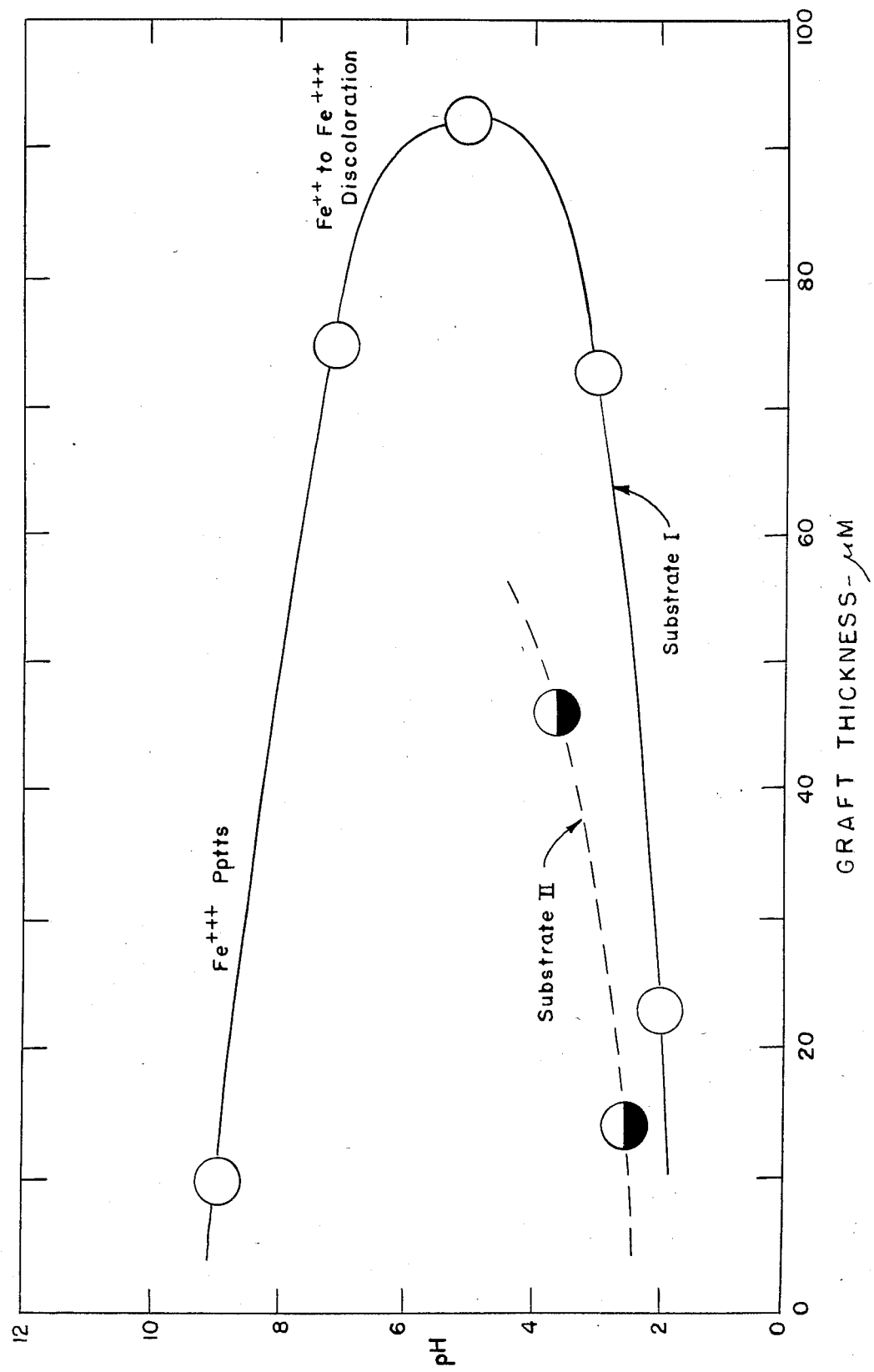
FIG. 1 is a graph indicating the effect of pH on graft thickness.

The pre-formed substrate to be treated by the process of this invention may be any of a wide variety of solid or semi-solid polymers, the surface of which, upon being subjected to high energy ionizing radiation or ozonization, yields peroxides. The high energy ionizing radiation may take the form of $\gamma$-rays or high-energy electrons produced by a particle accelerator, all as known in the art. Peroxidation of the substrate occurs when such irradiation occurs in an oxygen-containing environment. Where the peroxidation is to be produced by ozonization, the polymer substrate is treated with a gaseous atmosphere containing ozone, again as noted in the aforementioned prior art. The extent of treatment may vary considerably depending on the substrate elected and the morphology of the graft sought to be produced. In the case of ozonization, the gaseous atmosphere should contain a sufficient volume of ozone to obtain the desired results. Peroxidation by means of ozonization would of course be limited to those substrates which do not degrade rapidly in the presence of ozone. For example, rubbers, whether natural or synthetic, which contain unsaturation as a part of their structure degrade quickly when exposed to ozone; hence, for such substrates, peroxidation by high energy ionizing radiation may be more effective than ozonization.

Examples of suitable polymeric substrates include both synthetic and natural polymers such as polyethylene, polypropylene, polymethylmethacrylate, silicone rubber, polycarbonates, polyesters, natural and synthetic rubbers, polyurethanes, polyamides, cured epoxy resins, cellulosics, polyvinyl chloride formulations, polystyrene, natural fibers and various copolymers. While the substrate may take the form of a sheet, film, fiber or powder, ordinarily it will take the form of a shaped or substantially-finished article which has both the desired configuration and bulk characteristics but requires some modification of its surface properties. It may be desirable, for example, to alter the physical, chemical, mechanical, and biological properties of the surface of the substrate without, at the same time, substantially modifying the basic or bulk properties of that substrate in order to impart a more lubricious surface to the preformed substrate, to render its surface more hydrophilic (or increase the hydrophilicity of the surface), to increase bondability or to provide a chemical means of immobilizing enzymes or other chemical species.

The peroxidized substrate, following irradiation or ozonization, will have peroxide groups on its surface, such groups including hydroperoxides. There are two basic peroxide-forming reactions that generally occur during peroxidation, one being the formation of a diperoxide and the other being the formation of a hydroperoxide. The reactions are summarized by equations (1) and (2) as follows:

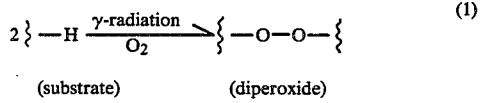

(substrate)     (diperoxide)     (1)

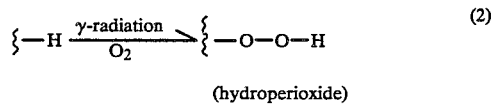

(hydroperioxide)     (2)

The thermal decomposition of the peroxides formed from equations (1) and (2) result in different radical fragments which initiate polymerization. This is summarized by equations (3) and (4), where M represents the monomer.

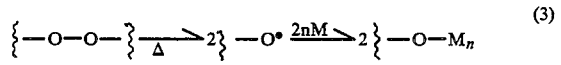     (3)

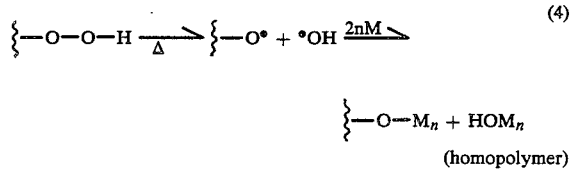     (4)

(homopolymer)

Equation (3) shows that the thermal cleavage of the diperoxide results in two active free radicals which initiate graft polymerization with the monomer. On the other hand, the thermal cleavage of a hydroperoxide, as equation (4) shows, results in one active free radical on a polymer chain capable of initiating graft polymerization and one free hydroxyl radical. It is the hydroxyl radical that initiates homopolymerization of the monomer unless such homopolymerization is somehow inhibited or suppressed.

An effective homopolymerization-inhibiting agent has been found to be ferrous ion, although other variable valence metal ions are believed capable of complexing with and of being potentially reduced by squaric acid. Those of cobalt manganese, molybdenum, tin and indium have been found to be reduced from their oxidized (-ic) state to their reduced (-ous) state. Other metal ions, such as cerium, chromium, thallium, and vanadium, may be reduced in the presence of squaric acid but at a greatly reduced rate. Any suitable metal salt may provide the source of the metallic ions; in the case of ferrous ions, a preferred source is ferrous ammonium sulfate, although other ferrous salts such as ferrous sulfate, ferrous chloride, ferrous iodide and ferrous bromide may be effectively employed.

The mechanism for inhibiting homopolymerization is illustrated by the following equation (5) in which a lower valence metal ion, ferrous ion, is used to react with the hydroxyl radical in a redox system to produce hydroxyl ion. This hydroxyl ion can then no longer initiate free radical polymerization.

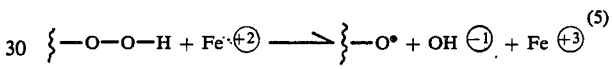     (5)

In addition to inhibiting homopolymerization by converting free hydroxyl radicals to hydroxyl ions, the metal ion in its lower valence state also functions as an accelerator of polymerization. Migration of such ion into the substrate therefore tends to increase the depth of the graft. While other factors have been found to be highly significant in controlling graft depth, density, and thickness, the inclusion of an agent capable of complexing with the lower valence ion in the monomer bath affects the extent of penetration of the metal ion and thereby contributes in controlling the depth of graft formation.

That agent, squaric acid, when utilized with the lower valence metal ion in the presence of some water soluble monomers, allows the metal ion to react and also promotes the conversion of the -ic to the -ous complex, thus establishing the basis for a continual usage polymer grafting bath. Agents forming iron complexes having stability constants lower than squaric acid (log $K=3-4$), such as malonic acid, have not been found effective in controlling graft depth nor of regenerating the lower valence metal ions. Other complexing agents producing complexes having about the same stability constants as squaric acid have been found ineffective; in some instances they have formed precipitates in the presence of certain water soluble monomers and, in other cases, they have poisoned the polymerization reactions. Materials such as pyridine dicarboxylic acids, oxalic acid, quinaldic acid, 5 nitro-1, 10-phenanthroline fall in this category. Complexes having higher stability constants (log $K=10$) have been found to complex the lower valence metal ions to the extent that such ions are unavailable for redox reactions.

Squaric acid and the squarate ion (diketocyclobutenediol and its dianion) are not only capable of complexing with the metal ions but, in addition, function as a reducing agent to regenerate the lower valence metal ion from its higher valence state. The overall stoichiometric reaction is illustrated by the following equation (6):

$$18H_2O + H_2C_4O_4 + 10Fe^{+3} \longrightarrow 4H_2CO_3 + 10H_3O^{+1} + 10Fe^{+2} \quad (6)$$

The following equilibrium is assumed:

$$H_3O^{+1} + HCO_3^{-1} \rightleftharpoons H_2CO_3 \rightleftharpoons H_2O + CO_2 \quad (7)$$

Using a ferrous-ferric system for purposes of illustration, the general sequential mechanism involved is believed to be:

$$\text{ferrous ion} + \text{squarate ion} \longrightarrow \quad (8)$$
$$\text{ferrous-squarate complex (colorless)}$$

$$\text{ferrous-squarate complex} \xrightarrow{\text{redox}} \text{ferric-squarate complex (violet)} \quad (9)$$

$$\text{ferric-squarate complex} \xrightarrow[\text{ion}]{\text{excess squarate}} \text{ferrous-squarate complex} \quad (10)$$

Regeneration of the lower valence state metal ion occurs without the production of by-products that might interfere with subsequent grafting procedures utilizing the same monomer bath. Consequently, articles to be treated for alteration of their surface properties through graft copolymerization may be successively exposed to the same monomer bath. Homopolymerization of the monomer is inhibited by the metal ions in their lower valence state, through a redox system in which such ions are converted to their higher valence, and the squarate ion then reacts to reduce the metal ions back to their lower valence state. Complexing of the lower valence ion by the squarate ion does not materially reduce the effectiveness of the lower valence metal ion as an accelerator capable of lowering the activation energy of the initiation reaction nor does it significantly reduce the availability of the lower valence ion as a homopolymerization-inhibiting agent.

It is to be emphasized that the by-products of reaction (6), within the concentration ranges used, are non-deleterious to the process and the grafting reaction and are non-toxic. Such considerations are of obvious importance in the surface alteration of a wide variety of products, and are essential where the substrate takes the form of a medical product expected to come into direct contact with living tissue.

The monomer used in the graft polymerization may be any of a wide variety of ethylenically unsaturated compounds, the particular selection depending primarily on the surface properties sought. Among suitable monomers capable of free-radical polymerization under the conditions set forth are methacrylamide, sodium methacrylate, citraconic acid, methylolacrylamide, 2-hydroxyl ethyl acrylate, potassium acrylate, sodium acrylate, calcium acrylate, cobalt acrylate, 2-acrylamido-2-methyl propane sulfonic acid, acrylamide, HEMA (2-hydroxy-ethyl methacrylate), GMA (glycidylmethacrylate), vinyl pyrrolidone, styrene, acrylic acid, methacrylic acid. Best results are obtained with water soluble monomers and water soluble solvent systems.

The grafting reaction should be carried out in an oxygen free environment at temperatures and pressures selected to maintain the monomer in solution, such temperatures generally falling within the range of 0° to 150° C. The reaction temperatures more commonly fall within the range of 20° to 100° C. The reaction temperatures selected, the reaction times used, and the concentration of monomer and other reactants may be varied considerably depending on the monomer and substrate composition, the extent of pre-irradiation, and the particular surface properties sought by the graft polymerization. The metal ion concentration may be calculated on a stoichiometric basis for insuring completeness of reaction to convert all of the hydroxyl radical to hydroxyl ion (the particular concentration depending on the particular variable-valence metal ion selected) and should not be in substantial excess of the concentration needed to produce a graft having the desired characteristics.

Where squaric acid is used, the squarate ion concentration may also be calculated and should be moderately in excess of that needed to regenerate all of the metal ion to its lower valence state.

While the use of squaric acid (or the squarate ion) in a graft polymerization reaction is believed unique and highly advantageous, it should be understood that other factors, particularly the pH of the reaction mixture and the addition of a salt to the monomer bath, have been found highly significant in controlling graft depth, density, and thickness. The usefulness of squaric acid in helping to control graft depth does not detract from the importance of such other factors and, in fact, if the benefits of squaric acid in regenerating the metal ion to its lower valence state were deemed unnecessary or undesirable, then squaric acid might be excluded as a reactant. In such a case, limited re-use of the monomer bath might still be possible and the characteristics of the graft could be adjusted by controlling pH and/or salt concentration. However, since conversion of the metal ion to its lower valence state for the purpose of regenerating the monomer bath, and thereby greatly extending the life of that bath, would be important considerations in many commercial operations, and since squaric acid has other advantages which contribute to the effectiveness of the grafting process as already described, it is believed that in most instances it would be beneficial to include rather than exclude squaric acid in carrying out the process of this invention.

The pH of the reaction mixture should be acidic with lower pH values tending to promote thinner grafts of greater density. The optimum pH in any given system will depend largely on the particular substrate and monomer selected, and the graft depth, density, and properties sought to be achieved but, in general, the pH of the reaction mixture should be maintained in the general range of approximately 1 to 6, the preferred range being approximately 2 to 5, and the optimum range being approximately 3 to 4. As a neutral pH is approached—more specifically, at a pH above about 5—the grafting efficiency drops off and the possibility of precipitating the activator salt increases. At a pH below about 3, grafting efficiency is reduced. Where squaric acid is included in the reaction, a pH of 2 or even lower might be effective; however, where squaric acid is omitted, pH 2 should be considered a practical lower limit. In any event, pH control has been found to be of major importance in controlling graft characteristics. The degree of swelling that the subsurface layers of the substrate experience is determined by the monomer-substrate interactions. These, in turn, depend upon the ionic environment of the grafting solution which has been found to be a function of pH.

The addition to the monomer bath of a salt such as sodium chloride, potassium chloride, sodium sulfate, or potassium sulfate, or other neutral salt which is stable at the selected pH range and is preferably the salt of a strong acid and strong base, when combined with pH adjustment, has also been found effective in controlling graft depth, density, and thickness. It has been observed that, as salt concentration is increased, the clarity of the graft improves. Such increase in clarity is considered surprising, the reasons for such a result are not fully understood. It is believed that the salt ions may tend to compromise possible polyelectrolyte effects produced in the monomer bath. Salt concentrations may be varied within the solubility limits for the particular salt involved, with higher concentrations tending to decrease graft thickness, possibly because the additional ions occasioned by the presence of the salt dilute the ions active in the polymerization reaction. Any suitable base (sodium hydroxide, potassium hydroxide, or the like) may be added as the reaction proceeds to offset the increased acidity caused by the complexing reaction when squaric acid is used (see equation (6)). If desired, suitable buffers may be used to maintain the selected pH of the monomer bath.

The process of this invention is further revealed by the following illustrative examples:

EXAMPLE 1

A monomer bath continuously purged free of oxygen was prepared with 4.0 g acrylamide (Aldrich), 0.1 g ferrous ammonium sulfate hexahydrate (Mallinckrodt), and 0.1 g squaric acid dissolved in 36.0 g distilled deoxygenated water. The resulting solution pH was 2.5. The solution was heated to 50° C. while being constantly purged with nitrogen. Two sections approximately 3.8 cm in length of formulated polyvinyl chloride catheter tubing (Edwards Laboratories), pre-irradiated in air by γ-radiation to a total dose of 2.5 to 2.8 Mrads in a commercial irradiation facility, were introduced into the grafting solution bath and allowed to react for four hours. Inspection of the treated samples revealed a thin uniform hydrophilic and lubricious hydrogel graft over the surfaces of the samples. No homopolymerization of the bath was observed. Similar results were observed when the monomer bath was purged with carbon dioxide instead of nitrogen. It should be noted that some additives in formulated polyvinyl chlorides will inhibit the desired reaction and that this assessment must be made prior to carrying out the grafting reaction. Specifically, it has been shown that Ferro 760X (Ferro Chemical Corp.) will inhibit the polymerization.

EXAMPLE 2

Procedures similar to those of Example 1 were carried out at different pH levels to determine the effects of pH on the grafting reaction. Five monomer baths were prepared by dissolving 4.0 g acrylamide, 0.1 g ferrous ammonium sulfate hexahydrate, and 0.05 g squaric acid in 36 g distilled and deoxygenated water. Of the five tubes, one was adjusted to pH 1 with 10% sulfuric acid and the other four were adjusted to pHs 3, 5, 7 and 9 with 5.0 N sodium hydroxide. Five centimeter sections of formulated polyvinyl chloride catheters, pre-irradiated by γ-radiation in air to a total dose of 2.5 Mrads, were introduced into the grafting solutions while such solutions were maintained at 50° C. and constantly purged free of oxygen with nitrogen. The reactions were allowed to proceed for two hours. No visible changes, and specifically no evidence of homopolymerization, occurred in any of the baths during the reaction period. Following treatment in the monomer bath, the catheter samples were examined and were stained (methylene blue) to estimate the density of the grafts and extent of hydrophilicity. The catheter specimen from the tube adjusted to pH 1 was grafted with an extremely thin dense layer of polyacrylamide; pH 3 yielded a thin graft; pH 5 gave the heaviest graft (of low density; pH 7 gave a dense thin graft that tended to penetrate the substrate and pH 9 yielded a thin sparse graft. FIG. 1 shows a typical plot of the effect of pH on graft thickness.

EXAMPLE 3

Another monomer bath was prepared which has the same compositions as previously described except it had double the squaric acid concentration. Instead of adding 0.05 g of the acid, 0.10 g was introduced. Also the solution had no pH adjustment. This composition produced a solution pH of 2.5. Grafting conditions were then duplicated as previously described. The reaction was allowed to proceed for four hours. At the conclusion of the reaction a thin, uniform surface limited graft was obtained as evidenced by staining. The nature of this graft was superior to any obtained by adjusting the pH of the grafting solution (see Example 2).

EXAMPLE 4

The grafting of a hydrophilic polyacrylamide layer onto the outer surfaces of polyethylene, formulated poly (vinyl chloride), and silicone rubber substrates was achieved as follows. All of the substrates were in the form of tubing, the poly (vinyl chloride) tubing being monolumen 7 French catheter tubing, the polyethylene tubing being radiopaque of 0.18 cm I.D. and 0.24 cm O.D., and the silicone rubber tubing being of 0.13 cm I.D. and 0.22 cm O.D. All tubular substrates were pre-irradiated by γ-radiation in air to a total dose of 2.5 Mrads. Multiple substrate samples were provided for grafting of each type of substrate in three different monomer baths. Bath A was prepared by dissolving 30 g acrylamide and 0.75 g ferrous ammonium sulfate hexahydrate in 270 g water, and then adding sulfuric acid (10%) dropwise until pH 3 was reached. Solution B was prepared exactly as the first solution except that 0.0.5 g N', N'-methylenebisacrylamide was added as a cross-linking agent. Solution C was prepared like solution A except that no sulfuric acid was added. The grafting solutions, each totaling 300 g, were divided into three 100 milliliter vessels so that sections of each of the three different tubular substrates could be grafted into the different monomer baths. The tubular substrates were cut into sections and introduced into the respective grafting vessels after they had been purged for approximately 10 minutes with nitrogen. The nitrogen was left flowing through the tubular substrates as they were lowered into the grafting solutions to preclude the possibility of monomer solutions entering the lumens. Nitrogen purging was continued through the grafting process. The substrates were grafted at 50° C., the reaction time for the formulated poly (vinyl chloride) samples being one hour, the time for the polyethylene samples being three hours, and the time for the silicone rubber samples being five hours. After treatment, the catheter sections were removed from the monomer baths and placed in one liter of distilled water to soak. No homopolymerization was observed in any such procedures, and in all cases hydrophilic grafts were obtained. In comparison with similar tests which differed by reason of including squaric acid, it was observed that squaric acid was effective in confining the grafts to the substrate surfaces whereas in these tests without squaric acid the grafts penetrated such surfaces to a substantially greater extent.

EXAMPLE 5

A bath was prepared with 0.1 g ferric ammonium sulfate dodecahydrate in 36.0 g distilled deoxygenated water. Another solution was prepared as the one described, plus it contained 0.1 g of squaric acid. Both solutions were kept at 50° C. for three days with a continuous purge of nitrogen. At the end of three days 4.0 g of acrylamide was added to each of the solutions. Three inch sections of poly (vinyl chloride) tubes, pre-irradiated by γ-radiation in air to a total dose of 3.3 Mrads, were introduced into the grafting solutions. Each tube had a continuous purge of nitrogen through its lumen. The reactions were allowed to proceed for three hours at 50° C. Inspection of the tube in the monomer solution without the squaric acid revealed a non-grafted hydrophobic surface. However, the tube that was in the monomer solution with the squaric acid showed that grafting had occurred as was evidenced by a lubricious, hydrophilic surface, thereby demonstrating the regenerative ability of the squaric acid to form ferrous ions from ferric ions as summarized by equation (6). Also, the squaric acid-ferrous ion complex stabilized the solution from oxidizing the ferrous ion to the ferric species upon contact with atmospheric oxygen. A similar experiment wherein air was bubbled through aqueous solutions of ferrous ammonium sulfate hexahydrate, one with and the other without squaric acid added, showed that the solution containing only the ferrous ammonium sulfate hexahydrate was rapidly converted to the ferric species whereas the solution containing the squaric acid was substantially unaffected.

EXAMPLE 6

Five different monomer baths, continuously purged free of oxygen, were prepared with 36.0 g distilled deoxygenated water, 0.1 g squaric acid and 0.1 g ferrous ammonium sulfate hexahydrate. Of the five baths, solution A had 4.0 g hydroxy ethyl methacrylate added; solution B had 4.0 g vinyl pyrrolidone added; solution C had 4.0 g 2-acrylamido-2-methyl propane sulfonic acid added; solution D had 4.0 g citraconic acid added; and solution E had 4.0 g methyl acrylamide added. Three inch sections of poly (vinyl chloride) tubes, pre-irradiated by γ-radiation in air to a total dose of 3.3 Mrads, were introduced into the grafting solutions. The reactions were allowed to proceed for 16 hours at 50° C. and constantly purged with nitrogen. Inspection of the poly (vinyl chloride) tubes showed that grafting had occurred with all the monomers, as was evidenced by stain retention (methylene blue).

EXAMPLE 7

A monomer bath continuously purged free of oxygen was prepared with 4.0 g acrylamide, 0.1 g ferrous ammonium sulfate hexahydrate, and 0.1 g squaric acid dissolved in 36.0 g distilled deoxygenated water. To this solution was added sodium chloride to a concentration level of 2.0 Molar. The solution was heated to 50° C. while being constantly purged with nitrogen. A three inch section of poly (vinyl chloride) tube, pre-irradiated by γ-radiation in air to a total dose of 3.3 Mrads, was introduced into the grafting solution. The reaction was allowed to proceed for 16 hours at 50° C. and constantly purged with nitrogen. Inspection of the poly (vinyl chloride) tube shows that grafting had occurred, as was evidenced by a lubricious, hydrophilic surface. The graft was confined to the surface and had greater density and clarity than grafts formed without the presence of salts.

EXAMPLE 8

Four different monomer baths, continuously purged free of oxygen, were prepared with 4.0 g acrylamide, 0.1 g squaric acid dissolved in 36.0 g distilled deoxygenated water. Of the four baths, solution A had 0.1 g ferrous ammonium sulfate hexahydrate added; solution B had 0.0293 g manganous carbonate added; solution C had 0.0742 g cobaltous nitrate added; and solution D had 0.0252 g cuprous chloride added. Three inch sections of poly (vinyl chloride) tubes, pre-irradiated by γ-radiation in air to a total dose of 3.3 Mrads, were introduced into the grafting solutions. The reactions were allowed to proceed for 16 hours at 50° C. and constantly purged with nitrogen. Inspection of the poly (vinyl chloride) tubes showed that grafting had occurred in solutions A, B, and C, as was evidenced by stain retention (methylene blue) without homopolymerization of the bath. The tube from solution D was not observably grafted.

EXAMPLE 9

A first monomer bath continuously purged free of oxygen (by nitrogen) was prepared with 12.0 g acrylamide (Aldrich, electrophoresis grade) dissolved in 108 ml distilled water to which was added 0.001 g ferrous ammonium sulfate hexahydrate (Mallinckrodt) dissolved in 1.0 ml water. A second bath was similarly prepared except that 1.0 ml of an aqueous solution containing 0.010 g ferrous ammonium sulfate hexahydrate was added to the acrylamide solution. Into each bath were placed one slab (½"×2") of silicone rubber vulcanized at room temperature (RTV) and a heat-cured silicone rubber slab of similar size (Heyer-Schulte), both pre-irradiated in air by γ-radiation to a total dose of 5.0 Mrads at The University of California, Irvine. The baths were maintained at 75° C. and, after cooling, the slabs were removed and analyzed for lubricity. Each bath maintained a pH of approximately 4 throughout the treatment procedure.

Throughout the graft polymerization procedure both monomer baths remained very fluid. No increases in viscosity were noticed, indicating little if any homopolymerization.

The slabs of RTV and hot-cured silicone rubber accepted acrylamide polymer grafts from both of the monomer baths. No discoloration of the grafted substrates was noted. After washing, the slabs all revealed a high degree of lubricity, indicating that hydrogel coatings had been grafted on all of the silicone rubber slabs. Therefore, in such a graft polymerization process carried out at pH 4 in the absence of squaric acid, lubricious grafts were formed on each of the elastomeric substrates.

Example 10

Two ferrous ammonium sulfate solutions were prepared in two 50 ml volumetric flasks one with 0.50 g ferrous ammonium sulfate hexahydrate and the other with 5.00 g ferrous ammonium sulfate hexahydrate. Both flasks were purged with nitrogen for 15 minutes and were then filled to the 50 ml calibration marks with distilled water which had previously been purged with nitrogen for 15 minutes. When the ferrous ammonium sulfate was completely dissolved in each of the flasks, the contents of those flasks were again purged of oxygen by bubbling nitrogen therethrough.

160 ml of 10% acrylamide (Aldrich, electrophoresis grade) solution was prepared with deoxygenated water and was purged with nitrogen for 15 minutes. After purging, the acrylamide solution was adjusted to pH 3 by adding 1.5 drops of concentrated sulfuric acid. The pH 3 solution was then divided equally among 4 reaction tubes each containing 40 ml monomer solution. Dissolved ferrous ammonium sulfate was then added to each of the tubes as follows: to tube (1) was added 0.5 ml of the 0.010 g/ml ferrous ammonium sulfate solution, yielding a final concentration of 0.005 g/ml; to tube (2), 1.0 ml of 0.010 g/ml ferrous ammonium sulfate solution were added to provide a final concentration of 0.010; to tube (3), 0.5 ml of 0.10 g/ml ferrous ammonium sulfate solution was added to yield a final concentration of 0.050 g/ml; to tube (4) 1.0 ml of 0.10 g/ml ferrous ammonium sulfate solution was added to produce a final concentration of 0.100 g/ml ferrous ammonium sulfate. All reaction tubes were purged with nitrogen for 15 minutes following the addition of the ferrous ammonium sulfate solutions.

Into each tube was then placed a pre-irradiated RTV silicone rubber (Heyer-Schulte) strip or slab pre-irradiated by γ-radiation in air to a total dose of 5 Mrads. The contents of all tubes were maintained at 75° C. and nitrogen was continuously bubbled therethrough to exclude oxygen. After a reaction period of three hours, all of the silicone rubber specimens were removed, washed in water, and evaluated.

The four solutions remained fluid and showed no evidence of homopolymerization. Viscosity measurements were made at the end of the reaction period and the changes in viscosity were too slight to indicate any significant homopolymerization. Specifically, compared with a starting viscosity of 3.0 centipoises (cps) for all of the monomer solutions at the commencement of the polymerization process, tube (1) had a final viscosity of 4.5 cps, tube (2) had a final viscosity of 5.0 cps, tube (3) a final viscosity of 3.2 cps, and tube (4) a final viscosity of 5.0 cps.

The silicone rubber strip from tube (1) was grafted with a lubricious and hydrophilic coating and there was no evidence of degradation in the physical properties of the substrate. The rubber strip from tube (2) was also grafted with a hydrophilic coating but the lubricity of that coating appeared lower than the sample from tube (1). The samples from tubes (3) and (4) were hydrophilic and their grafted coatings were more lubricious than the coatings of the specimen treated in tube (2). Thus, the samples from all of the tubes were grafted with hydrophilic lubricious coatings, the substrates retained their physical properties, and slight variations in the extent of lubricity were noted. Using ferrous ammonium sulfate as a polymerization initiator and silicone rubber as the substrate, an acidity level for the polymerization reaction of about pH 3 is found preferable to pH 4, at least in the absence of squaric acid, because of the effective grafts produced at substantially different ferrous ammonium sulfate concentrations.

EXAMPLE 11

A 10% acrylamide solution and a ferrous ammonium sulfate solution of 0.10 g/ml were prepared as set forth in Example 10. To the 40 ml of monomer solution in tube (1) were placed 0.5 ml of the ferrous ammonium sulfate solution, yielding a final ferrous ammonium sulfate concentration of 0.05; to the monomer solution in tube (2) was placed 1.0 ml of the ferrous ammonium sulfate solution to provide a final ferrous ammonium sulfate concentration of 0.10. The acidity of the solutions or baths in each of the tubes was pH 4 and no adjustments were made. The solutions were deoxygenated as described in Example 10, and grafting was undertaken at 75° C. for three hours using strips of silicone rubber (as described in Example 10) as the substrates. After three hours, the strips were removed, washed, and evaluated.

Both specimens had grafts showing good hydrophilicity and lubricity. The grafts were clearly superior to those produced at pH 4 using similar materials and conditions but at ferrous ammonium sulfate bath concentrations below 0.05 g/ml. In relation to the results of Example 10, and again in the absence of squaric acid, if the polymerization reaction is conducted at pH 3 then superior grafts are formed at ferrous ammonium sulfate concentrations at or above 0.005 g/ml, whereas if the reaction is conducted at pH 4 (a tenfold increase in pH) then to obtain a superior graft the ferrous ammonium sulfate concentration should be at or above 0.05 g/ml (a tenfold increase).

EXAMPLE 12

The grafting solutions used in Example 11 were retained and used again in a second grafting procedure to determine whether the buildup of ferric ions in tubes (1) and (2) would prevent effective grafting. Each tube received a fresh strip of pre-irradiated RTV silicone rubber, the contents were deoxygenated with nitrogen, and the tubes were heated at 75° C. for three hours. The pH of the contents of each tube was about 4. At the end of three hours, the specimens were removed, washed, and evaluated along with the solutions from which they were taken.

The initial viscosity of the monomer baths of each tube was 3.0 cps. The final viscosity of tube (1), the tube having an initial ferrous ammonium sulfate concentration of 0.05 g/ml, was 5.0 cps. The final viscosity of tube (2), which had an initial ferrous ammonium sulfate concentration of 0.10 g/ml, was 4.9 cps. Such a small increase in viscosity indicates virtually no homopolymerization occurred, and that in turn indicates that at the high ferrous ammonium sulfate concentrations involved the monomer baths might be used several times even in the absence of squaric acid.

The rubber strips each had lubricious and hydrophilic grafts formed on their surfaces. There was no apparent degradation in the elastomeric properties or other properties of the substrates.

EXAMPLE 13

The use of water-soluble ferrous salts other than ferrous ammonium sulfate, in graft copolymerization on poly (vinyl chloride) catheter sections (single lumen, 3"

lengths, 7 French) (American Edwards) at an acidity level adjusted to pH 3, and in the absence of squaric acid, is revealed by the following.

A 10% by weight aqueous acrylamide solution was prepared, deoxygenated, adjusted to pH 3 with 10% sulfuric acid, and divided into three reaction tubes of 40 g solution each. The three tubes were purged with nitrogen for 30 minutes.

Three different ferrous salts were added to the three tubes in such a way that the ferrous ion concentration was the same in each tube (0.0358%). In tube (1), 0.100 g ferrous ammonium sulfate.6H$_2$O (Mallincrkodt) were added to the monomer solution; in tube (2),0.097 g ferrous iodide. 4H$_2$O (Ventron) were added to the monomer solution; in tube (3),0.082 g ferrous bromide.6H$_2$O were added to the monomer solution. The tubes were supported in a 50° C. water bath and the 3" sections of poly (vinyl chloride) catheter tubing was introduced into each of the tubes while they were maintained in an oxygen-free environment. Two hours later, at the end of the reaction, all of the solutions were still very liquid, revealing that the ferrous salts were all effective in preventing homopolymerization.

The surfaces of all of the poly (vinyl chloride) substrates had become hydrophilic as a result of the grafting procedure, but the specimen treated in tube (2) (in the ferrous iodide solution) was only slightly lubricious in comparison with the other two. All three samples were stained with methylene blue and re-examined for graft development.

The sample grafted in tube (1) (ferrous ammonium sulfate) had a uniform graft with a thickness estimated at about 100 microns. A slight swelling of the sample was noted. The sample treated in tube (3) (ferrous bromide) was less swollen and the graft was thinner, its thickness being estimated at approximately 50 microns. Again, the surface of the catheter section was uniformly grafted.

The specimen treated in tube (2) (ferrous iodide) was relatively poorly grafted. The methylene blue dye wetted the surface but no thickness of graft could be visually detected. Microscopic examination of the cross section turned on its side revealed a finely beaded graft-like surface, but the blue color was faint.

EXAMPLE 14

A monomer bath which was prepared by dissolving 24 g of acrylamide powder (Aldrich, electrophoresis grade) in 216 ml of nitrogen-purged distilled water. After mixing, the solution was purged again for 15 minutes with nitrogen. Thereafter, 0.5 g of ferrous ammonium sulfate hexahydrate was dissolved in 50 ml of nitrogen-purged water and the resulting solution was also purged with nitrogen for 15 minutes.

36 ml of the 10% acrylamide solution was poured into each of two reaction tubes. Tube (1) was labeled 0.010 g/ml Fe, pH 4, and tube (2) was labeled 0.005 g/ml Fe, pH 4, and both tubes were set aside.

The remaining acrylamide solution was divided evenly into two plastic beakers. The contents of one was adjusted to pH 5.0 by the addition of 0.5 N sodium hydroxide, and the contents of the other beaker were adjusted to a pH of 3.0 by the addition of concentrated sulfuric acid. 36 ml of the pH 5.0 solution was then placed in two more reaction tubes, with tube (3) labeled 0.010 g/ml Fe, pH 5 and tube (4) being labeled 0.005 g/ml Fe, pH 5. Similarly, two additional tubes each received 36 ml of the acrylamide solution adjusted to pH 3, with tube (5) being labeled 0.010 g/ml Fe, pH 3, and tube (6) being labeled 0.005 g/ml Fe, pH 3.

One tube from each pH group received 1.0 ml of the 0.010 g/ml Fe solution and the other tube from each group received 0.5 ml of the 0.010 g/ml Fe solution. All six tubes were then placed in a 75° C. constant temperature circulating water bath after each had received a pre-irradiated 1"×3" silicone rubber sample (pre-irradiated by γ-radiation in air to a total dose of 5.0 Mrads). Each tube was purged with nitrogen for the three hour duration of the test.

No visible changes (color, viscosity, etc.) occurred during the three hour experimental period. Viscosity changes were determined as follows:

| Tube | Initial Viscosity (cps) | Final Viscosity (cps) |
| --- | --- | --- |
| 1 | 3.0 | 5.0 |
| 2 | 3.0 | 12.5 |
| 3 | 3.0 | 3.5 |
| 4 | 3.0 | 5.0 |
| 5 | 3.0 | 4.0 |
| 6 | 3.0 | 10.0 |

The silicone rubber sample from tube (4) (i.e., pH 5, 0.005) showed a good hydrophilic lubricious graft. The silicone substrate was slighty distended, having grown ⅛" in length. No homopolymer was evident and there was no discoloration of the substrate.

The sample from tube (3) (i.e., pH 5, 0.010) had a fair graft that was hydrophilic but less lubricious than the graft from tube (4). The silicone polymer substrate was also distended about ⅛". Homopolymerization was not evident and there was no discoloration.

The silicone rubber sample from tube (6) (i.e., pH 3, 0.005) showed a good hydrophilic surface that was extremely lubricious. The silicone polymer was distended about 1", however. The solution was viscous but the only homopolymer that appeared to be present was on the silicone specimen. There was no discoloration.

The sample from tube (5) (i.e., pH 3, 0.010) revealed an excellent graft providing a smooth hydrophilic and lubricious surface. The properties of the graft and its texture and quality were superior to that of any other graft in this test. The solution remained quite fluid with no homopolymer in evidence. No distension or discoloration of the substrate was found.

The sample from tube (2) (i.e., pH 4, 0.005) had a highly lubricious hydrophilic graft. However, the silicone rubber substrate was severely distended, having increased 1.5" in length. The grafting solution was slightly viscous but still liquid. Homopolymer was noted on the specimen. No discoloration was present.

The sample from tube (1) (i.e., pH 4, 0.010) had a good hydrophilic lubricious graft. The grafting solution remained highly liquid without discoloration. However, the silicone rubber specimen had distended approximately ¾".

On the basis of these findings, a pH of 3.0 appears ideal, in the absence of squaric acid, when the ferrous ammonium sulfate concentration of the acrylamide solution is about 0.010 g/ml.

EXAMPLE 15

The following experiment was undertaken to determine the effect of various concentrations of salt in the grafting of an acrylamide polymer on the surfaces of silicone film substrates. Particular attention was directed to the effect of the salt on the swelling of the substrates.

Figure 2:
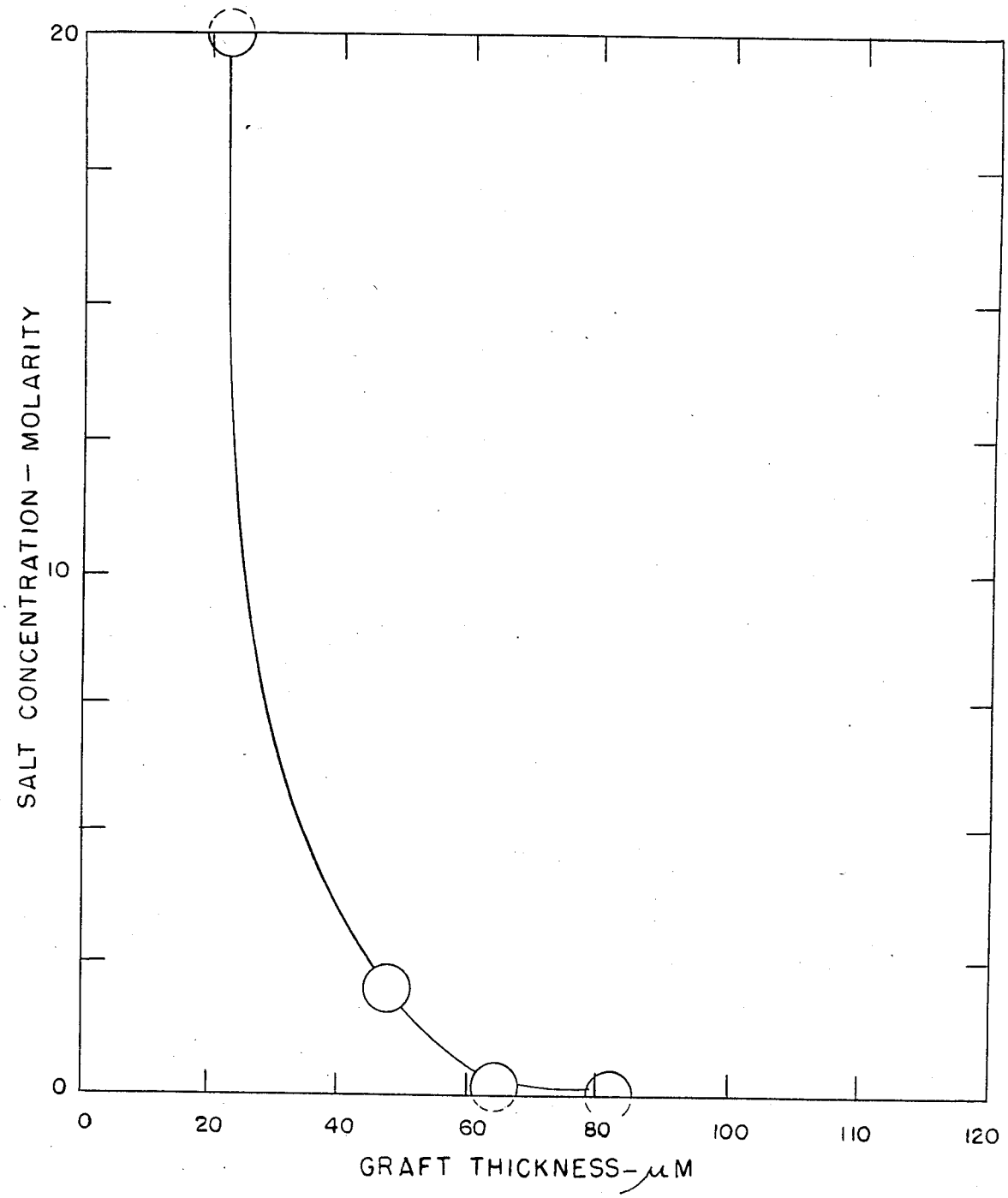
FIG. 2 is a graph indication the effect of salt concentration on graft thickness at pH 3.

Three NaCl salt solutions were made up in 500 ml volumetric flasks at 0.02 M, 0.20 M, and 2.00 M. Acrylamide solutions were prepared in eight reaction tubes as follows: to two tubes each containing 4.0 g acrylamide (Aldrich) were added 36 ml each of the 0.02 M salt solution; to two other tubes each containing 4.0 g acrylamide were added 36 ml each of 0.20 M salt solution; to two other tubes each containing 4.0 g acrylamide were added 36 ml of 2.00 M salt solution. Two additional tubes were each prepared using 36 ml distilled water and 4.0 g acrylamide to serve as controls. It should also be noted that the concentration of salt in the grafting bath has an effect on graft thickness as well as graft density. FIG. 2 shows the effect on graft thickness at pH =3.

One of each of 0.02 M, 0.20 M, and 2.00 M salt/acrylamide solutions were adjusted to pH 3 by dropwise addition of 10% sulfuric acid. Also, one of the tubes containing a control solution was similarly adjusted to pH 3. The pH of the four remaining tubes was established at pH 4.5.

The solutions in all of the reaction tubes were deoxygenated with nitrogen, and 0.10 g (0.25%) ferrous ammonium sulfate was added to each of the tubes. Nitrogen was bubbled through all of the tubes for an additional 30 minutes for further deoxygenation.

Silicone substrate samples of 0.015" thickness were previously cut to strip dimensions of 1"×2½" and had been γ-irradiated to 2.5 Mrads at a commercial irradiation facility. Following such irradiation, the samples were weighed as follows:

| Substrate Sample | Weight before Grafting (gms) | Grafting Conditions |
|---|---|---|
| 1 | 0.7575 | control, pH 3 |
| 2 | 0.6695 | 0.02M, pH 3 |
| 3 | 0.7370 | 0.20M, pH 3 |
| 4 | 0.7354 | 2.00M, pH 3 |
| 5 | 0.7467 | control, pH 4.5 |
| 6 | 0.7243 | 0.02M, pH 4.5 |
| 7 | 0.7519 | 0.20M, pH 4.5 |
| 8 | 0.7631 | 2.00M, pH 4.5 |

After weighing, the silicone substrated were put into their respective grafting solutions and maintained at 50° C. for 6 hours. Following such treatment, the substrates were washed in water, measured (both wet and dry), and reweighed (dry) to determine salt and pH effects.

| | Length Wet | | |
|---|---|---|---|
| Substrate Sample | Prior Length | Subsequent Length | % Change |
| 1 | 2.5" | 2 9/16" | +2.44% |
| 2 | 2.5" | 2 9/16" | +2.44% |
| 3 | 2.5" | 2 9/16" | +2.44% |
| 4 | 2.5" | 2 9/16" | +2.44% |
| 5 | 2.5" | 2 11/16" | +6.98% |
| 6 | 2.5" | 2 11/16" | +6.98% |
| 7 | 2.5" | 2 11/16" | +6.98% |
| 8 | 2.5" | 2 ⅝" | +5.66% |

| | Length Dry | | |
|---|---|---|---|
| Substrate Sample | Prior Length | Subsequent Length | % Change |
| 1 | 2.5" | 2 17/32" | 1.23% |
| 2 | 2.5" | 2 17/32" | 1.23% |
| 3 | 2.5" | 2 17/32" | 1.23% |
| 4 | 2.5" | 2 9/16" | 2.44% |
| 5 | 2.5" | 2 9/16" | 2.44% |
| 6 | 2.5" | 2 9/16" | 2.44% |
| 7 | 2.5" | 2 9/32" | 3.61% |
| 8 | 2.5" | 2 9/16" | 2.44% |

| | Dry Weight | | | |
|---|---|---|---|---|
| Substrate Sample | Weight before (grams) | Weight after (grams) | % Change | pH of Reaction |
| 1 | 0.7575 | 0.7754 | 2.31% | pH 3 |
| 2 | 0.6695 | 0.6977 | 4.04% | pH 3 |
| 3 | 0.7370 | 0.7568 | 2.62% | pH 3 |
| 4 | 0.7354 | 0.7400 | 0.62% | pH 3 |
| 5 | 0.7467 | 0.7999 | 6.65% | pH 4.5 |
| 6 | 0.7243 | 0.7813 | 7.3% | pH 4.5 |
| 7 | 0.7519 | 0.7900 | 4.82% | pH 4.5 |
| 8 | 0.7631 | 0.7982 | 4.40% | pH 4.5 |

| | Percent of Water in Graft | |
|---|---|---|
| Substrate Sample | % Water in Hydrated Graft | pH of Reaction |
| 1 | 75.1% | pH 3 |
| 2 | 69.8% | pH 3 |
| 3 | 69.3% | pH 3 |
| 4 | 92.0% | pH 3 |
| 5 | 65.3% | pH 4 |
| 6 | 68.9% | pH 4 |
| 7 | 70.5% | pH 4 |
| 8 | 72.6% | pH 4 |

The average increase in thickness of the substrate specimens grafted at a reaction pH of 3 was 0.0150" (2.67%) while the average thickness increase for those grafted at pH 4.5 was 0.01565" (6.71%). Following treatment, all of the substrate samples were found to have hydrophilic and lubricious surfaces.

Prior to grafting, all of the thin substrate samples were substantially clear. The grafting treatment reduced the clarity of all of the samples treated at pH 4.5 so that such samples became generally opaque. Among the samples treated at pH 3, however, the substrates were progressively less opaque with increases in the salt concentration of the grafting bath. The substrate treated in a bath having a salt concentration of 2.00 M (sample 4) was nearly clear following the grafting procedure. Sample 4 was found to have a relatively thin graft and, since it did not penetrate deeply into the substrate, had a relatively high water pickup.

The greater effects with respect to swelling and increases in dry weight were caused more by pH adjustment than by variations in salt concentration.

The only polyelectrolyte effect noticeable was the clarity increase among grafted specimens caused by higher concentrations of salt. This polyelectrolyte effect may be more useful in producing a thin graft than short reaction times because shorter reactions tend to result in spotty grafting. The thin transparent graft obtained on sample 4 was observed to be quite uniform.

While in the foregoing we have disclosed embodiments of the invention in considerable detail for purposes of illustration, it will be understood by those skilled in the art that many of these details may be varied without departing from the spirit and scope of the invention.

We claim:

1. A process for producing a graft copolymer which comprises the graft polymerization of a water-soluble ethylenically-unsaturated compound, in aqueous solution, with a substantially insoluble pre-formed solid or semi-solid polymeric substrate having peroxide groups, including hydroperoxide groups, along the polymer chains thereof, wherein the improvement comprises carrying out aid polymerization in the presence of a variable valence metal ion in a reduced state capable of oxidizing to convert free hydroxyl radical to hydroxyl ion and thereby suppress homopolymerization of said monomer in said solution, and thereafter adjusting the pH of the reaction mixture by adding an acid or base to maintain a selected, substantially constant, acidic pH within the range of about 2 to 5 in the absence squanic acid at a selected reaction time and temperature to control the depth, density, and thickness of graft polymerization upon the surface of said pre-formed polymeric substrate.

2. The process of claim 1 in which said pH is about 3 to 4.

3. The process of claim 1 in which said solution also contains a neutral salt dissolved therein.

4. The process of claim 3 in which said salt is the salt of a strong acid and strong base.

5. The process of claim 4 in which said pH is about 3 to 4.

6. The process of claim 1 in which there is the preliminary step of treating said pre-formed polymeric substrate with high energy ionization radiation or ozonation to produce said peroxide groups.

7. The process of claim 1 in which said pre-formed polymeric substrate is removed from said solution after graft copolymerization has occurred upon the surfaces thereof exposed to said solution, and a second pre-formed polymeric substrate having peroxide groups, including hydroperoxide groups, along the polymer chains thereof is introduced in said solution to graft copolymerize said monomer onto the surfaces thereof.

* * * * *

UNITED STATES PATENT AND TRADEMARK OFFICE
CERTIFICATE OF CORRECTION

PATENT NO. : 4,589,964

DATED : May 20, 1986

INVENTOR(S) : Mayhan, Kenneth G., Janssen, Robert A., and Bertrand, William J.

It is certified that error appears in the above-identified patent and that said Letters Patent is hereby corrected as shown below:

Column 17, line 13, cancel "aid" and substitute "said"

Signed and Sealed this

Twenty-third Day of September 1986

[SEAL]

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,589,964

DATED : May 20, 1986

INVENTOR(S) : Mayhan, Kenneth G., Janssen, Robert A., & Bertrand, William J.

It is certified that error appears in the above-identified patent and that said Letters Patent is hereby corrected as shown below:

Column 17, line 20, cancel "squanic" and substitute "squaric"

Signed and Sealed this

Eleventh Day of November, 1986

Attest:

DONALD J. QUIGG

Attesting Officer

Commissioner of Patents and Trademarks